US012647511B2

(12) United States Patent     (10) Patent No.:   US 12,647,511 B2
Choi                              (45) Date of Patent:        Jun. 2, 2026

(54) METHOD AND SERVER FOR PROVIDING ON-SCREEN AUTOMATIC RESPONSE SERVICE USING AUTOMATIC POP-UP THROUGH VOICE CALL AUTO-REPLY

(71) Applicant: iCubeOn inc., Seoul (KR)

(72) Inventor:  Seung Jin Choi, Seoul (KR)

(73) Assignee: iCubeOn inc., Seoul (KR)

( * ) Notice:   Subject to any disclaimer, the term of this patent is extended or adjusted under 35 U.S.C. 154(b) by 291 days.

(21) Appl. No.: 18/583,839

(22) Filed:     Feb. 21, 2024

(65)              Prior Publication Data

US 2024/0195907 A1      Jun. 13, 2024

Related U.S. Application Data

(63) Continuation      of      application      No. PCT/KR2021/011200, filed on Aug. 23, 2021.

(51) Int. Cl.
H04M 1/72484      (2021.01)
H04M 1/72403      (2021.01)
(52) U.S. Cl.
CPC ...  H04M 1/72484 (2021.01); H04M 1/72403 (2021.01)
(58) Field of Classification Search
None
See application file for complete search history.

(56)              References Cited

U.S. PATENT DOCUMENTS

| | | | |
|---|---|---|---|
| 8,693,997 B2* | 4/2014 | Kim | H04W 4/16 |
| | | | 455/418 |
| 2014/0155039 A1* | 6/2014 | Kim | H04M 1/72436 |
| | | | 455/466 |
| 2016/0080558 A1* | 3/2016 | Kim | H04W 4/18 |
| | | | 455/566 |

(Continued)

FOREIGN PATENT DOCUMENTS

| | | | |
|---|---|---|---|
| KR | 2019006293 A | 6/2019 | |
| KR | 102047497 B1 * | 11/2019 | G06Q 30/02 |

(Continued)

OTHER PUBLICATIONS

International Search Report for PCT/KR2021/011200, 2 pages, May 19, 2022.

*Primary Examiner* — Adolf Dsouza
(74) *Attorney, Agent, or Firm* — ZION IP; Byungwoong Park

(57)              ABSTRACT

Provide are a method and server for providing an on-screen automatic response service using automatic pop-up through a voice call auto-reply. A method of providing an on-screen automatic response service (ARS) through a voice call auto-reply includes receiving a voice call from a mobile terminal, checking whether a software development kit (SDK), which is necessary to execute program location information (URL) for providing the ARS on the mobile terminal directly without user intervention, is installed, and executing the program location information (URL) directly without user intervention to provide the ARS or providing (Continued)

the program location information (URL) to the mobile terminal and providing the ARS according to an execution command for the program location information (URL) received from a user depending on whether the software development kit is installed.

4 Claims, 6 Drawing Sheets

(56)                    References Cited

U.S. PATENT DOCUMENTS

2023/0036432  A1      2/2023   Choi

FOREIGN PATENT DOCUMENTS

| KR | 102197687 | B1 |   | 12/2020 |           |          |
|----|-----------|----|---|---------|-----------|----------|
| KR | 20210060906 | A | * | 5/2021 | ............ | G06Q 30/08 |
| KR | 102304185 | B1 |   | 9/2021 |           |          |
| WO | 2021101195 | A1 |   | 5/2021 |           |          |

* cited by examiner

METHOD AND SERVER FOR PROVIDING ON-SCREEN AUTOMATIC RESPONSE SERVICE USING AUTOMATIC POP-UP THROUGH VOICE CALL AUTO-REPLY

The following description relates to a technique for providing an automatic response service, and more particularly, to a method and server for providing an on-screen automatic response service using automatic pop-up through a voice call auto-reply.

BACKGROUND ART

Automatic response service (ARS) is a service for providing information to a user's mobile terminal in the form of a voice signal. The ARS provides information in the form of a voice signal according to a predetermined scenario while changing the scenario (menu) according to a dual-tone multi-frequency DTMF signal input from a user's mobile terminal to provide information of the corresponding scenario as a voice signal.

Meanwhile, recently, a visible ARS, which provides a user interface (UI) screen in addition to such a voice-based ARS, has also been provided. The visible ARS may be simply implemented even in mobile terminals such as a smartphone. This service is very convenient in that a user does not need to wait or remember an announcement because screen information linked to the announcement can be visually provided.

A mobile terminal on which a software development kit (SDK) necessary for automatic execution of the visible ARS is installed can receive the service directly without user intervention. However, when a mobile terminal does not have the SDK, a user should click program location information (URL) after the mobile terminal receives the URL in the form of a text message or the like in order to receive the visible ARS.

Accordingly, a separate database or an inquiry means is required to check whether the SDK needed for automatic execution of the program location information (URL) is installed on the mobile terminal, and thus system configuration is complex and costly.

SUMMARY

Technical Problem

The present invention is directed to providing a method and server for providing an on-screen automatic response service using automatic pop-up without user intervention through a voice call auto-reply.

Technical Solution

One aspect of the present invention provides a method of providing an on-screen automatic response service (ARS) through a voice call auto-reply includes receiving a voice call from a mobile terminal, checking whether a software development kit (SDK), which is necessary to execute program location information (URL) for providing an automatic response service (ARS) on the mobile terminal directly without user intervention, is installed, and executing the program location information (URL) directly without user intervention to provide the ARS or providing the program location information (URL) to the mobile terminal and providing the ARS according to an execution command for the program location information (URL) received from a user depending on whether the SDK is installed.

In an additional aspect, when the SDK is installed on the mobile terminal, the ARS may be provided by allowing the program location information (URL) to be automatically executed on a browser using automatic pop-up.

In an additional aspect, when the SDK is not installed on the mobile terminal, the program location information (URL) may be sent to the mobile terminal in the form of a text message and may be allowed to be executed on a browser to provide the ARS when the user clicks and executes the program location information (URL).

In an additional aspect, the automatic response service (ARS) may be implemented as an app for a smartphone (either as an independent application or on a web browser), and the app may provide an auto pop-up command and auto pop-up information.

In addition, in one embodiment, the step of checking whether the SDK is installed on the mobile terminal may include the steps of: Transmitting a command to the mobile terminal that starts the SDK installed on the mobile terminal, and Confirming that the SDK is installed on the mobile terminal if a response to the command is received.

In another general aspect, a server for providing an on-screen automatic response service (ARS) through a voice call auto-reply includes a communication processing unit configured to receive a voice call from a mobile terminal, a mode control unit configured to control an execution mode by checking whether a software development kit (SDK), which is necessary to execute program location information (URL) for providing an automatic response service (ARS) on the mobile terminal directly without user intervention, is installed; and a service execution unit configured to execute the program location information (URL) directly without user intervention to provide the ARS or providing the program location information (URL) to the mobile terminal and providing the ARS according to an execution command for the program location information (URL) received from a user depending on whether the SDK is installed.

In an additional aspect, when the SDK is installed on the mobile terminal, the mode control unit may control the service execution unit such that the program location information (URL) is automatically executed on a browser using automatic pop-up.

In an additional aspect, when the SDK is not installed on the mobile terminal, the mode control unit may send the program location information (URL) to the mobile terminal in the form of a text message and may control the service execution unit such that the program location information (URL) is executed on a browser when a user clicks the program location information (URL).

In an additional aspect, the ARS may be implemented as an app for a smartphone, and the app may provide an auto pop-up command and auto pop-up information.

Advantageous Effects

The method and server for providing an on-screen automatic response service using automatic pop-up without user intervention through a voice call auto-reply according to an embodiment do not require a separate database for checking the installation of a separate SDK and multiple steps for inquiry. Thus, it is possible to simplify configuration, improve service speed, and also reduce operating costs.

DETAILED DESCRIPTIONS OF EXEMPLARY EMBODIMENTS

Figure 1:
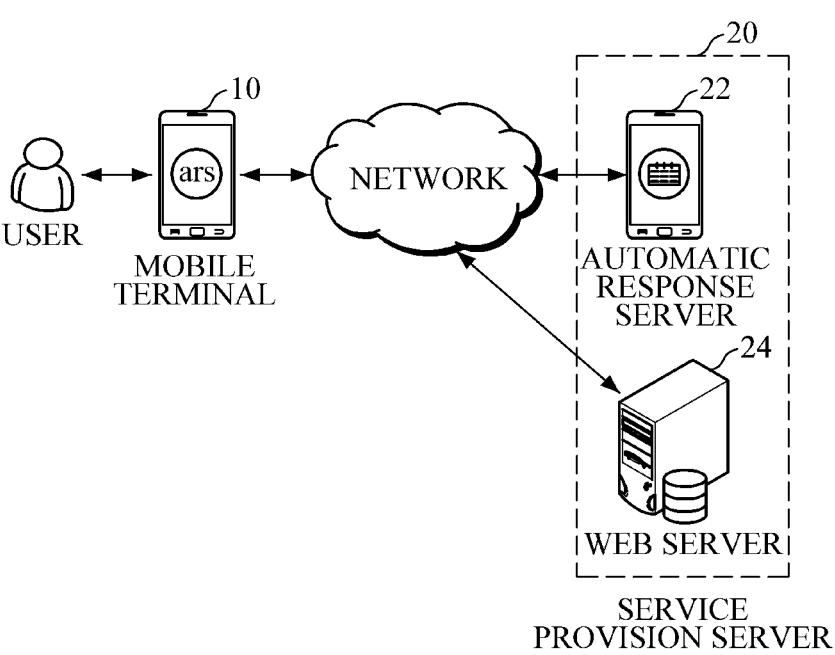
FIG. 1 is a schematic diagram showing a system for providing an on-screen automatic response service through a voice call auto-reply according to an embodiment of the present invention.

Advantages and features of the present invention, and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The present invention is merely defined by the appended claims. Like reference numerals refer to like elements throughout.

In the following description, when the detailed description of the relevant known functions or configurations is determined to unnecessarily obscure the gist of the present invention, the detailed description will be omitted. Also, terms used herein are defined in consideration of the functions of embodiments of the present invention and may be changed depending on a user, the intent of an operator, or a custom. Therefore, the definitions should be made based on the contents throughout the specification.

The combinations of the blocks of the block diagram and the operations of the flowchart may be performed by computer program instructions (execution engines), and these computer program instructions may be installed on processors of general-purpose computers, special-purpose computers, or other programmable data processing apparatuses. Thus, the instructions, which are executed via processors of computers or other programmable data processing apparatuses, create a means for performing functions specified in the blocks of the block diagram or in the operations of the flowchart.

These computer program instructions may also be stored in a computer-available memory or a computer-readable memory that can direct computers or other programmable data processing apparatuses to implement the functions in a particular manner. Thus, the instructions stored in the computer-available memory or computer-readable memory can produce a manufacturing item including an instruction means for performing the functions specified in the blocks of the block diagram or in operation of the flowchart.

In addition, the computer program instructions may also be installed on computers or other programmable data processing apparatuses. Thus, a series of operations may be performed on computers or other programmable data processing apparatuses to create a computer-implemented process so that the instructions which are executed on the computers or other programmable data processing apparatuses implement actions for executing the functions specified in the blocks of the block diagram and the operations of the flowchart.

Also, it should be noted that each of the blocks or operations may represent a portion of a module, segment, or code including one or more executable instructions for implementing specified logical functions and that in some alternative embodiments, the functions specified in the blocks or operations may be performed irrespective of order. For example, two blocks or operations shown in succession may, in fact, be executed substantially concurrently, or the blocks or operations may sometimes be executed in the reverse order if necessary.

Hereinafter, embodiments of the present invention will be described in detail with reference to the accompanying drawings. However, the following embodiments of the present invention may be modified in different forms, and the scope of the present invention is not limited to the embodiments set forth herein. Embodiments of the present invention are provided for those skilled in the art to completely understand the present invention.

FIG. 1 is a schematic diagram showing a system for providing an on-screen automatic response service through a voice call auto-reply according to an embodiment of the present invention.

Referring to FIG. 1, a system for a mobile terminal providing an on-screen automatic response service includes an automatic response server 22 configured to automatically receive a call and provide an automatic response service according to a call connection of an originating mobile terminal 10 and a web server 24 configured to interoperate with the automatic response server 22 and provide an automatic response service user interface (ARS UI) screen to the originating mobile terminal 10. The automatic response server 22 and the web server 24 may be collectively referred to as a service provision server 20. In addition, the originating mobile terminal 10 and the automatic response server 22 are connected to each other through a voice communication network, and the web server 24 is connected to the originating mobile terminal 10 and the automatic response server 22 through a data packet network.

The originating mobile terminal 10 refers to a well-known terminal for providing a call service through a communication network and may be a smartphone. In addition to this conventional configuration, the originating mobile terminal 10 according to the present invention may receive and display an ARS UI screen from the web server 24 through the communication network as described above and may receive and output ARS voice information matched to the ARS UI screen in the form of a call voice while a call connection is established with the automatic response server 22.

The automatic response server 22 includes a smartphone but need not be limited only to such devices. The automatic response server 22 according to the present invention is configured to interoperate with the web server 24 and provide support so that the mobile terminal 10 can be provided with an ARS UI screen and is configured to provide an ARS voice service matched to the ARS UI screen to the originating mobile terminal 10 with which a call connection is established. For example, a business operator who operates a small business including a skin-care shop, a beauty salon, a restaurant, etc. may provide various automatic response services such as real-time reservation, ordering, and a mini customer center to customers just by having a smartphone. The automatic response server 22 will be described in detail below.

The web server 24 may register the automatic response server 22 that wants to provide an ARS and may store the ARS UI screen information which is set by the registered automatic response server 22 and provide the ARS UI screen information to the originating mobile terminal 10 upon the request of the automatic response server 22. A detailed configuration and operation of the web server 24 will be described below.

Figure 2:
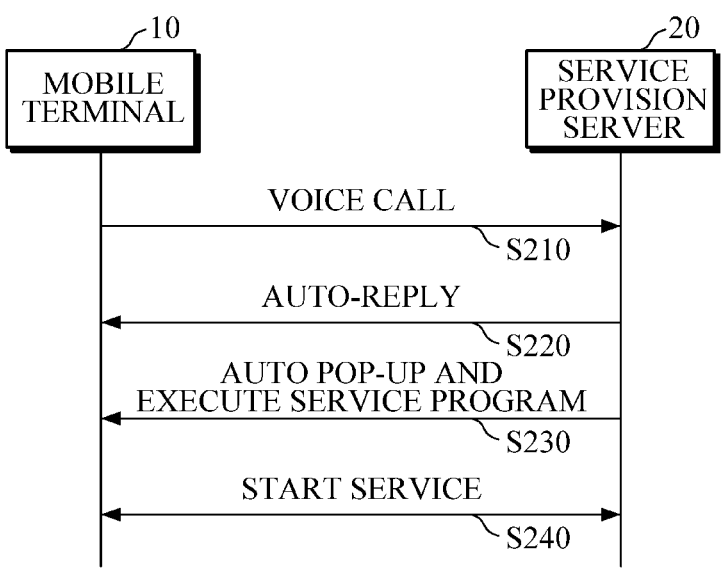
FIG. 2 is a sequence diagram illustrating service provision when a software development kit (SDK) is installed on a mobile terminal.

FIG. 2 is a sequence diagram illustrating service provision when a software development kit (SDK) is installed on a mobile terminal.

First, the mobile terminal 10 makes a voice call to the service provision server 20 (S210). The service provision server 20 automatically or manually receives the voice call (S220), and activates the SDK installed on the mobile terminal to automatically execute a program for providing an ARS, which pops up on the mobile terminal 10 (S230). Service provision then begins (S240).

Figure 3:
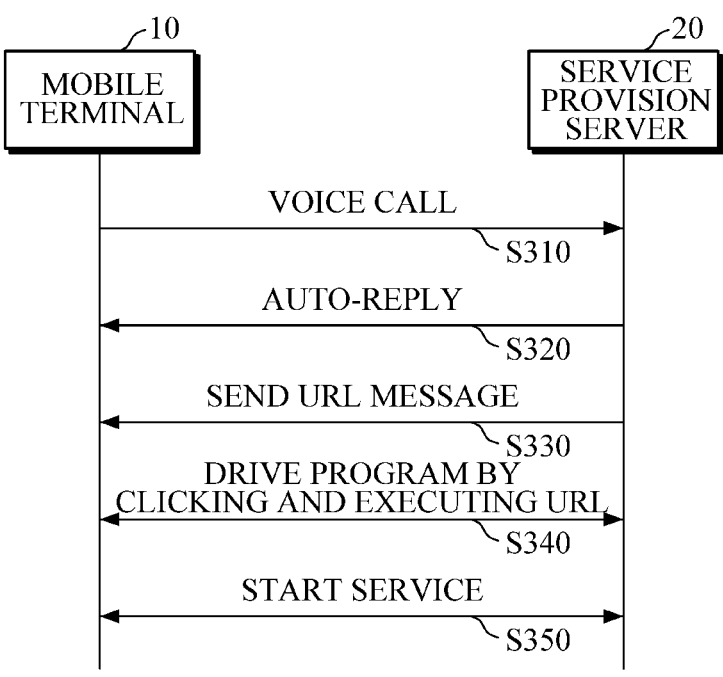
FIG. 3 is a sequence diagram illustrating service provision when an SDK is not installed on a mobile terminal.

FIG. 3 is a sequence diagram illustrating service provision when an SDK is not installed on a mobile terminal.

First, the mobile terminal 10 makes a voice call to the service provision server 20 (S310). The service provision server 20 automatically or manually receives the voice call (S320), sends program location information (URL) for providing an ARS to the mobile terminal 10 in the form of a text message (S330), and causes the URL to be executed when a user clicks the URL (S340). Subsequently, service provision is started (S350).

Figure 4:
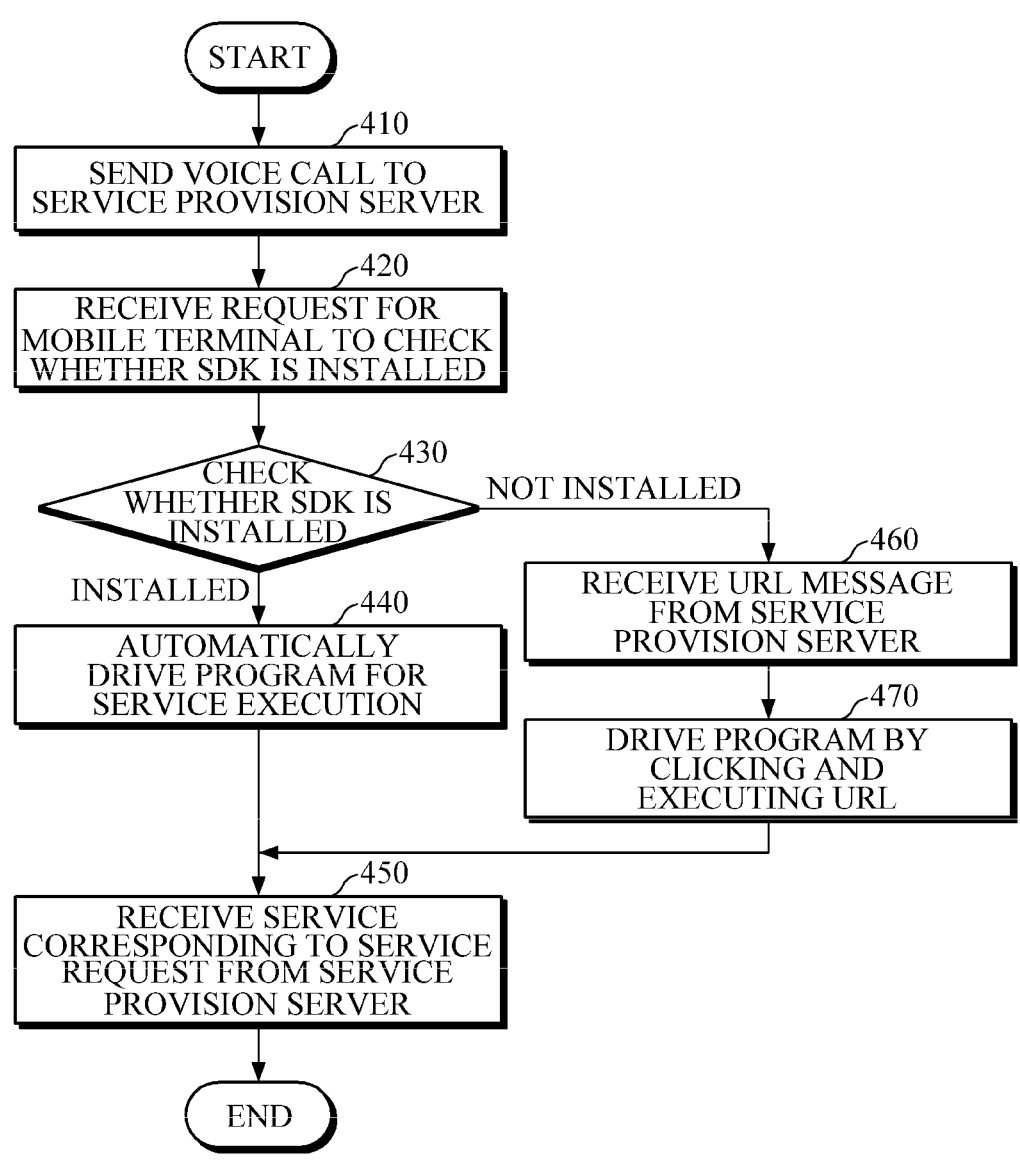
FIG. 4 is a flowchart illustrating a method of a mobile terminal receiving an on-screen automatic response service through a voice call auto-reply according to an embodiment of the present invention.

FIG. 4 is a flowchart illustrating a method of a mobile terminal receiving an on-screen automatic response service through a voice call auto-reply according to an embodiment of the present invention.

First, the mobile terminal sends a voice call to a service provision server (410). In other words, the mobile terminal makes a voice call to the service provision server. When the service provision server receives the voice call, the service provision server checks whether an SDK necessary to execute program location information (URL) for providing an ARS on the mobile terminal directly without user intervention is installed on the mobile terminal.

The presence of the aforementioned SDK on the mobile terminal can be verified in various ways.

For example, the service provision server may directly or through another server such as a web server, transmit a command to the mobile terminal that starts the SDK installed on the mobile terminal. If a response is received to this command (such as a response indicating that the program location information (URL) for providing the automatic response service (ARS) has been executed or that an SDK capable of responding to the command exists), it is confirmed that the aforementioned SDK is installed on the mobile terminal.

Alternatively, the service provision server may directly or through another server such as a web server, transmit a command to the mobile terminal that starts the SDK installed on the mobile terminal. If no response is received to this command (such as a response indicating that the program location information (URL) for providing the automatic response service (ARS) has been executed or that an SDK capable of responding to the command exists) within a predetermined time or after a predetermined number of commands have been sent, it is confirmed that the aforementioned SDK is not installed on the mobile terminal.

As described above, the service provision server unilaterally transmits SDK-related commands to the mobile terminal (caller terminal) and bases the response to the presence or absence of the SDK on the response of the mobile terminal. This eliminates the need for communication between the specific app and its corresponding app server and the service provision server in order to check whether a specific app or SDK is installed on the mobile terminal. This has the advantage of reducing the burden on the mobile terminal.

The mobile terminal receives the aforementioned verification request in the same manner (420).

The mobile terminal checks whether the SDK is installed thereon (430). Depending on whether the SDK is installed, the mobile terminal may directly execute program location information (URL) to receive the ARS or may receive program location information (URL) in the form of a text message and provide the ARS according to an execution command received from a user.

In other words, when the SDK is installed on the mobile terminal, the program location information (URL) is automatically executed on a browser using automatic pop-up (440), and then the mobile terminal continues to receive a service corresponding to the user's service request from the service provision server (450).

When the SDK is not installed on the mobile terminal, the mobile terminal receives program location information (URL) from the service provision server in the form of a text message (460) and executes the URL on a browser when a user clicks the URL (470). Subsequently, the mobile terminal continues to receive a service corresponding to the user's service request from the service provision server (450).

Meanwhile, the ARS is implemented as an app for a smartphone, and this app provides an automatic pop-up command and automatic pop-up information.

Figure 5:
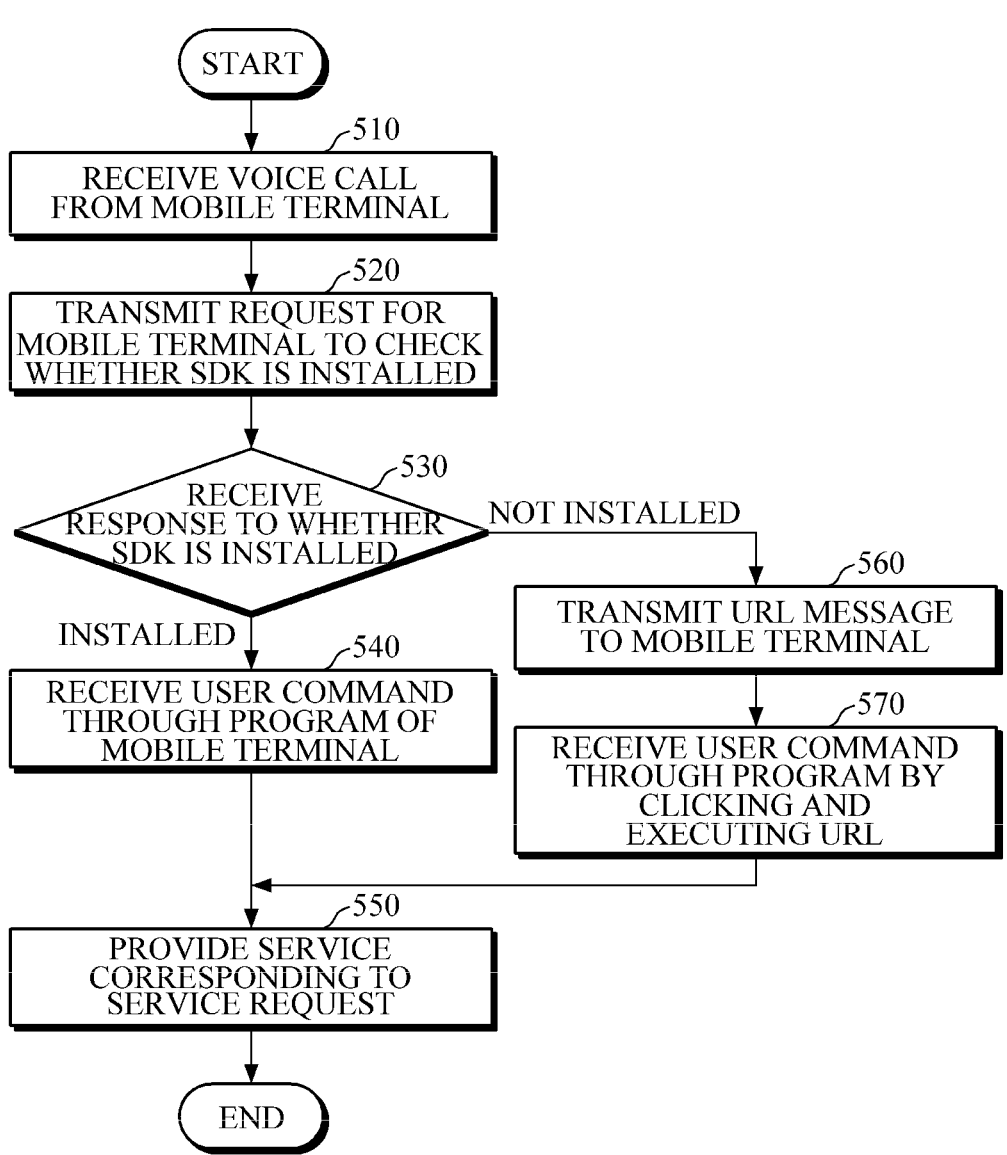
FIG. 5 is a sequence diagram illustrating a method of a service provision server providing an on-screen automatic response service through a voice call auto-reply according to an embodiment of the present invention.

FIG. 5 is a sequence diagram illustrating a method of a service provision server providing an on-screen automatic response service through a voice call auto-reply according to an embodiment of the present invention.

First, the service provision server receives a voice call from a mobile terminal (510). In addition, the service provision server sends, to the mobile terminal, a request to check whether an SDK necessary to execute program location information (URL) for providing an ARS on the mobile terminal directly without user intervention is installed on the mobile terminal (520). The service provision server checks whether the SDK is installed on the mobile terminal (530). Depending on whether the SDK is installed, the service provision server directly executes program location information (URL) to provide the ARS or provides the program location information (URL) to the mobile terminal and provides the ARS according to an execution command received form a user.

In other words, when the SDK is installed on the mobile terminal, the service provision server receives a user command through a program of the mobile terminal by allowing the program location information (URL) to be automatically executed on a browser using automatic pop-up (540) and then continues to provide a service corresponding to the user's service request (550).

When the SDK is not installed on the mobile terminal, the service provision server sends program location information (URL) to the mobile terminal in the form of a text message (560), receives a user command through a program of the mobile terminal by allowing the URL to be executed on a browser when a user clicks the URL (570), and continues to provide a service corresponding to the user's service request.

Figure 6:
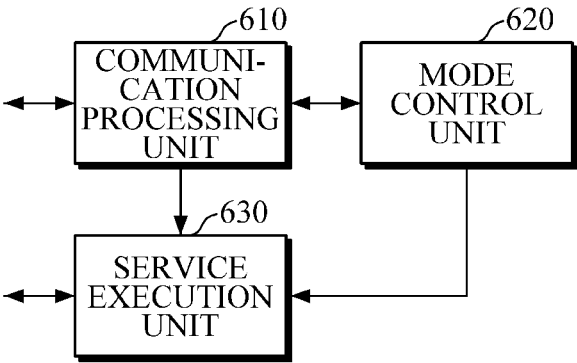
FIG. 6 is a diagram showing a service provision server for providing an on-screen automatic response service through a voice call auto-reply according to an embodiment of the present invention.

FIG. 6 is a diagram showing a service provision server for providing an on-screen automatic response service through a voice call auto-reply according to an embodiment of the present invention.

The service provision server includes a communication processing unit 610, a mode control unit 620, and a service execution unit 630.

The communication processing unit 610 receives a voice call from the mobile terminal.

The mode control unit 620 checks whether an SDK necessary to execute program location information (URL) for providing an ARS on the mobile terminal directly without user intervention is installed on the mobile terminal, and then controls an execution mode.

In detail, when the SDK is installed on the mobile terminal, the mode control unit 620 controls the service execution unit 630 such that the program location information (URL) is automatically executed on a browser using automatic pop-up. In addition, when the SDK is not installed on the mobile terminal, the mode control unit 620 sends the program location information (URL) to the mobile terminal in the form of a text message and controls the service execution unit 630 such that the program location information (URL) is executed on a browser when a user clicks the URL.

Depending on whether the SDK is installed, the service execution unit 630 directly executes program location information (URL) to provide the ARS or provides the program location information (URL) to the mobile terminal and provides the ARS according to an execution command received form a user.

So far, the present invention has been described with reference to embodiments thereof. It will be understood by those skilled in the art that various changes in form and details may be made therein without departing from the essential features of the present invention. Therefore, the disclosed embodiments should be considered in descriptive sense only and not for purposes of limitation. The scope of the present invention should be defined not by the detailed description but by the appended claims, and all differences falling within a scope equivalent to the claims should be construed as being encompassed by the present invention.

The invention claimed is:

1. A method of providing an on-screen automatic response service (ARS) through a voice call auto-reply, the method comprising:

receiving a voice call from a mobile terminal;

checking whether a software development kit (SDK), which is necessary to execute program location information (URL) for providing an automatic response service (ARS) on the mobile terminal directly without user intervention, is installed; and executing the program location information (URL) directly without user intervention to provide the ARS or providing the program location information (URL) to the mobile terminal and providing the ARS according to an execution command for the program location information (URL) received from a user depending on whether the SDK is installed, wherein the step of checking whether the SDK is installed on the mobile terminal comprises:

transmitting, unilaterally, a command to the mobile terminal that starts the SDK installed on the mobile terminal; and confirming that the SDK is installed on the mobile terminal if a predetermined response to the command is received within a predetermined time or after a predetermined number of the command has been sent, wherein when the SDK is not installed on the mobile terminal, the method further includes the steps:

determining that the SDK is not installed on the mobile terminal;

transmitting the program location information (URL) to the mobile terminal in the form of a text message;

receiving the user's clicking of the program location information (URL) on the text message;

executing the program location information (URL) on a browser; and providing the ARS via the mobile terminal, and wherein when the SDK is installed on the mobile terminal, the method further includes the steps:

determining that the SDK is installed on the mobile terminal;

executing, directly and automatically, the program location information (URL) on a browser on a browser using automatic pop-up; and providing the ARS via the mobile terminal.

2. The method of claim 1, wherein the ARS is implemented as an app for a smartphone, and the app provides an auto pop-up command and auto pop-up information.

3. A server for providing an on-screen automatic response service (ARS) through a voice call auto-reply, wherein the server comprises at least one processor and at least one memory storing executable instructions, and the instruction, when executed by the at least one processor, cause the at least one processor to perform the steps of:

receiving a voice call from a mobile terminal;

checking whether a software development kit (SDK), which is necessary to execute program location information (URL) for providing an automatic response service (ARS) on the mobile terminal directly without user intervention, is installed; and executing the program location information (URL) directly without user intervention to provide the ARS or providing the program location information (URL) to the mobile terminal and providing the ARS according to an execution command for the program location information (URL) received from a user depending on whether the SDK is installed, wherein the step of checking whether the SDK is installed on the mobile terminal comprises:

transmitting, unilaterally, a command to the mobile terminal that starts the SDK installed on the mobile terminal; and confirming that the SDK is installed on the mobile terminal if a predetermined response to the command is received within a predetermined time or after a predetermined number of the command has been sent, wherein when the SDK is not installed on the mobile terminal, the method further includes the steps:

determining that the SDK is not installed on the mobile terminal;

transmitting the program location information (URL) to the mobile terminal in the form of a text message;

receiving the user's clicking of the program location information (URL) on the text message;

executing the program location information (URL) on a browser; and providing the ARS via the mobile terminal, and wherein when the SDK is installed on the mobile terminal, the method further includes the steps:

determining that the SDK is installed on the mobile terminal;

executing, directly and automatically, the program location information (URL) on a browser on a browser using automatic pop-up; and providing the ARS via the mobile terminal.

4. The server of claim 3, wherein the ARS is implemented as an app for a smartphone, and the app provides an auto pop-up command and auto pop-up information.

* * * * *